3,527,723
PRESERVATIVE AND DRESSING COATING FOR AUTOMOBILE VINYL TOPS AND THE LIKE
James A. Stroh, Ferndale, and Robert J. Wesala, Dearborn Heights, Mich., assignors to Park Chemical Company, Detroit, Mich., a corporation of Michigan
No Drawing. Filed Mar. 6, 1968, Ser. No. 710,747
Int. Cl. C08g 17/00, 31/06
U.S. Cl. 260—22
10 Claims

ABSTRACT OF THE DISCLOSURE

A process of forming a preservative and conditioning coating on automobile vinyl tops and the like, comprising applying the coating composition to the vinyl surface by applying the composition with a sponge, soft cloth, etc., until the entire surface is wetted thoroughly; working the composition with a scrubbing action so that it is evenly distributed over the surface; and then buffing the coating lightly after it is dried to provide a high gloss finish, with said coating composition being comprised of: (a) about 0.5 to about 10% by weight emulsified organopolysiloxane oil having a viscosity from about 350 to about 250,000 centistokes at 25° C., (b) from about 1% to about 20% by weight of a water reducible polyester resin, (c) zero to about 2% by weight of a dried, and (d) a carrier fluid as the balance of the composition.

This abstract is for convenience purposes only to assist in searching of the technical literature and it should not be taken in any way as a limitation on the invention described hereinafter.

BACKGROUND OF THE INVENTION

This invention broadly relates to a method of forming a preservative or conditioner type coating on automobile vinyl tops, vinyl upholstery, convertible tops, urethane upholstery material, leather materials, and like products, to thereby provide the coated substrate with a tough, durable, antistatic, weather-proof, water repellent, anticorrosive, heat and freeze resistant, easily maintained and applied coating.

The state of the prior art relative to the invention described hereinafter is indicated by the following U.S. patents which resulted from a preliminary search: Donald V. Brown 2,804,440, Aug. 27, 1957; Joseph W. Keil 3,061,577, Oct. 30, 1962; Henry C. Geen 2,856,297, Oct. 14, 1958; Daniel H. Terry 2,955,047, Oct. 4, 1960; Larry Q. Green 2,702,276, Feb. 15, 1955; Charles Guss 2,757,094, July 31, 1956; Jean Rene Dumas 2,774,674, Dec. 18, 1956; LeRoy B. Edwards 2,789,379, Apr. 23, 1957; Michael M. Solomon 3,098,833, July 23, 1963; Chester C. Currie 2,523,281, Sept. 26, 1950; Ralph G. Swanson 2,614,049, Oct. 14, 1952; Henry H. Cooke et al. 2,626,870, Jan. 27, 1953; Chester C. Currie et al. 2,698,805, Jan. 4, 1955; Edward R. Taylor, Jr. 2,733,154, Jan. 31, 1956; and Edgar K. Hamilton 2,738,282, Mar. 13, 1956.

As is well known, the automotive industry is producing numerous automobiles with vinyl tops and this is not to mention the used car field wherein numerous autos with vinyl tops are already in existence. These vinyl tops present a problem with respect to their being maintained and kept in a proper and attractive condition. Certain products have been used in the field for reconditioning or preserving these vinyl tops. While attempts have been made to provide such satisfactory products, these attempts have not been acceptable for one reason or another. For example, such a product must be non-harmful to auto paint, rubber, chrome, glass, etc. The product must also be nontoxic to the average person's skin and give off no harmful vapors so that it can be applied without difficulty and, furthermore, such a product would necessarily have to be nonflammable.

Still further, the product would have to be stable and have a very long shelf life. Such a product must also be capable of easy and uniform application to give a final appearance without streaks and the product must show depth of color without excessive film buildup, while at the same time providing an acceptable and pleasing glossy finished surface to the vinyl top.

Accordingly, it is a primary object of this invention to provide a method of forming a preservative and conditioning coating on automobile vinyl tops and other substrate surfaces.

Another object of the present invention is to provide an improved coating composition.

Another object of the present invention is to provide a method of using said coating composition.

Still another object of the present invention is to provide an improved coating composition and method of using same wherein the composition contains a unique combination of an emulsified organopolysiloxane oil and a water reducible polyester resin.

Other objects, features and advantages of the present invention will become apparent from the subsequent description and the appended claims.

SUMMARY OF THE INVENTION

Briefly stated, the present invention comprises a method of using a coating composition to form a preservative and conditioning coating on automobile vinyl tops, vinyl upholstery, urethane upholstery, leather materials, convertible tops and the like, comprising applying said composition to a substrate to thereby form the coating thereon, said composition comprising: (a) about 0.5% to about 10% by weight emulsified organopolysiloxane oil, said oil having a viscosity from about 350 to about 250,000 centistokes at about 25° C., (b) from about 1% to about 20% by weight on an active resin basis of water reducible polyester resin said resin having a set time of less than about 8 hours, and a cure temperature from about 32° F. to about 120° F., (c) zero to about 2% by weight of a drier selected from the group consisting of naphthenates, linoresinates, linoleates hexates, resinates or inorganic salts of cobalt, copper, lead, manganese, zinc, calcium, iron or aluminum, (d) carrier fluid as the balance of the composition.

From a composition aspect, briefly stated, the present invention comprises a coating composition for use as an automobile vinyl top preservative and conditioner as well as a conditioner for convertible tops, vinyl upholstery, urethane upholstery, leather materials, and like substrate materials, comprised of: (a) about 0.5% to about 10% by weight emulsified organopolysiloxane oil, said oil having a viscosity from about 350 to about 250,000 centistokes at about 25° C., (b) from about 1% to about 20% by weight on an active resin basis of water reducible polyester resin said resin having a set time of less than about 8 hours, and a cure temperature from about 32°

F. to about 120° F., (c) zero to about 2% by weight of a drier selected from the group consisting of naphthenates, linoresinates, linoleates, hexates, resinates or inorganic salts of cobalt, copper, lead, manganese, zinc calcium, iron or aluminum, (d) carrier fluid as the balance of the composition.

DESCRIPTION OF PREFERRED EMBODIMENTS

Generally, the coating composition of this invention is applied by first cleaning the vinyl top surface and then wiping it dry. Next, any stains or discolorations are removed from light colored surfaces before application of the coating. The coating is applied with a sponge or soft cloth and the entire surface is wetted thoroughly with the coating. Next, the coating is worked into the surface with a scrubbing action and particularly it should be worked well into weathered and worn surfaces. Application of the coating is finished with long straight strokes and when the coating is dry to the touch it is buffed lightly, for example with a clean dry cloth. Then to achieve a high gloss finish, the coating may be subjected to additional buffing.

The emulsified organopolysiloxane oil used in the invention may satisfactorily be of the type conventionally available in the art. Broadly stated, the organopolysiloxane oil should be a dimethylpolysiloxane oil having a viscosity within the range of about 350 to about 350,000 centistokes at 25° C. On a preferred basis the viscosity should be within the range of about 50,000 to about 150,000 centistokes at 25° C., and best results have been obtained using an oil having a viscosity of about 100,000 centistokes. The methods of preparing these oils are known in the art and form no part of the present invention.

The amount of organopolysiloxane oil used in the composition should broadly be within the range of about 0.5% to about 10% by weight of the composition. On a preferred basis the organopolysiloxane oil should be present in the composition within the range of about 2% to about 8% by weight. If the amount of oil present in the composition is less than about 0.5%, then the application advantage obtained through the use of the oil is lost, and if the amount of oil used is higher than about 10% by weight of the composition, then the composition loses its desirable water resistance characteristics after the coating has been applied. Numerous emulsified organopolysiloxane oils falling within the above criteria which define the oils suitable in this invention, are available commercially, and any of these organopolysiloxane oils may be incorporated into the invention disclosed herein so long as the above limitations describing the usable oils are met.

By the term water reducible polyester resin as used herein, it is meant generally a water soluble polyester resin. By the term polyester as used herein it is intended to also include alkyd resins or drying oil resins, all of which can generally be considered to fall within the term polyester resins, as is known in the art.

The polyester resin should be one wherein after the carrier for the resin evaporates the resin is no longer water soluble and sets to a water resistant coating. The water dispersability or solubility of the resin and water is brought about by the presence of ammonia or an amine to neutralize the resin. Ammonium hydroxide can be used for this purpose or the more volatile strongly basic organic amines such as monoethyl amine, triethyl amine, and the like, may suitably be used. These may generally be termed volatile nitrogen containing agents which assist in rendering the polyester resin water reducible. In order to achieve real water solubility of the resin, a co-solvent or coupling solvent is normally used and these solvents may satisfactorily be ketones, ethers and the like; and, furthermore the coupling solvents should be water miscible.

The amount of water reducible polyester resin used, on an active resin basis, should broadly be within the range of about 1% to about 20% by weight of the composition. On a preferred basis the amount should be from about 2% to about 10% resin by weight of the composition.

The set time for the water reducible resin broadly stated, should be less than about eight hours and, preferably the set time should be less than about one hour. The terminology set time for the drying of polyester resins is well known in the art and, for example, is described in U.S. Pats. 3,098,834 and 3,345,313. The set time should be within the above limits such that the coating applied using the method of this invention is relatively dry after a reasonable amount of time has elapsed after the coating has been applied. The set time is generally determined by applying a 3-mil wet film of the polyester resin on glass and then determining the amount of time required for the deposited film to be set to the touch.

The cure temperature for the polyester resin should be such that the resin dries within the temperature range of about 32° F. up to about 120° F., and generally by this it is meant that the polyester resin should be an air drying resin and one which will dry within the temperature range just specified.

A preferred resin for use in the invention is a water reducible polyester resin neutralized with ammonium hydroxide and suitable for air drying at approximately room temperature. This resin has the following properties: (1) percent solids, 50%; (2) color (Gardner Scale), 12 maximum; (3) viscosity (Gardner-Brookfield method), 600–800 cps., (4) pH in 5% solution, approximately 8.5; (5) a neutralizing agent of ammonium hydroxide, and (6) a solvent system for the resin of water and a coupling solvent such as of the type disclosed in U.S. Pat. 3,098,834. This preferred resin is a maleic acid-unsaturated fatty acid based polyester. The drying property of this resin, as indicated by the deposition of a 3-mil wet film on glass, is a set time of approximately 20–25 minutes.

Other polyester resins considered suitable for use herein would be those disclosed in U.S. Pat. 3,098,834 and U.S. Pat. 3,345,313. Typical examples of such other suitable resins are as follows:

Example 1

This example illustrates the preparation of a water soluble cyclopentadiene-linseed oil copolymer vehicle.

| | Parts |
|---|---|
| Cyclopentadiene-linseed polymer (based on 80% linseed oil) | 900 |
| Maleic anhydride | 100 |

The copolymer, oil and maleic anhydride were heated to 450° F., with agitation and held for 45 minutes. The adduct was then cooled to room temperature and treated as follows:

| | Parts |
|---|---|
| Acid adduct prepared above | 10 |
| Butyl Cellosolve | 4.3 |
| 26° Bé. aqua ammonia | 1.2 |
| Water | 13.1 |

The adduct was dissolved in the butyl Cellosolve, neutralized with ammonia and diluted with water.

This final 35% non-volatile solution was clear and homogeneous and capable of further dilution without imparing its properties.

The clear vehicle was treated with 0.1% Mn as naphthenate. A film cast on glass set to touch in 30 minutes.

Example 2

An air-drying alkyd resin is prepared from 3 mols of phthalic anhydride, 2.2 mols of technical trimethylolethane, 2 mols of linseed oil fatty acids and 1 mol of crystalline dimethylolpropionic acid. The reactants are fed simultaneously to a reaction vessel equipped with a heating mantle, a stirrer, a thermometer, a $CO_2$ inlet and a reflux condenser fitted with a standard water trap. Two to four percent of xylene is included to aid in removal of water. The reaction mixture is heated, under an atmosphere of $CO_2$ to 221° C. in about one hour and held at this temperature with stirring until the acid number drops to 56–58. After cooling to 60° C., the resin is reduced to a solids content of 35%, by weight, using a mixture of 80 parts of water and 20 parts of tertiary butyl alcohol. The resin is adjusted to a pH of 7.5 with triethylamine.

The resin solution is found to have the following characteristics:

Viscosity (Gardner-Holdt) _____ Z–1
Color (Gardner) _____ 2–3
Appearance _____ (1)

[1] Translucent—slightly turbid.

Conventional water-soluble dryers are added to give a metal content of 0.9%, by weight, lead and 0.04% by weight manganese. Films of the product are drawn on tin and glass plates. These films show the following characteristics: they are set to touch within four hours, dry tack-free in 7.5 hours, and dry and hard within 18 hours. The films have a smooth, glossy finish, have an acceptable toughness and flexibility.

Example 3

An alkyd resin is prepared according to the procedure of Example 2 using 3 mols of phthalic anhydride, 2.2 mols of dipentaerythritol, 4 mols of linseed oil fatty acids and 1 mol of dimethylolpropionic acid. The cook is held for one hour at 204° C. and then at 221° C. until the acid number falls to between about 55 and 58. The viscosity (Gardner-Holdt) of the resultant resin is Z–6+, and the color (Gardner) is 5–6. The reaction mixture is neutralized with dimethylolamine and thinned with a mixture of 5 parts of water and 1 part of tertiary butanol to a solids content of about 40% by weight. Conventional water-soluble driers are added to give 0.1% by weight lead 0.02% by weight manganese, and 0.02% by weight, cobalt. Films having thickness of 0.003 inch are dry in 6 hours at room temperature.

A drier, while not absolutely essential to the composition described herein, may be incorporated to improve the resistance to water spotting of the deposited coating. Typical examples of suitable driers which may be used in the composition are the naphthenates, linoresinates, linoleates, hexates, resinates, or inorganic salts of cobalt, copper, lead, manganese, zinc, calcium, iron or aluminum.

The amount of drier present in the composition broadly state, may be anywhere from a total absence of drier up to a maximum of 2% by weight of the composition. Preferably stated, the drier should be in the composition within the range of about 0.01% up to about 1.5% by weight.

A carrier fluid is used as the balance of the composition. Preferably, the carrier fluid is water, however, numerous other carrier fluids may be used such as alcohols, for example, isopropyl or ethyl alcohol, mineral spirits, and the like. Numerous other carrier fluids will be apparent to those skilled in the art and no attempt will here be made to exhaustively define all of the various carrier fluids which may be used. Furthermore, it is considered possible for the coating composition disclosed herein to be applied from an aerosol container and such application is to be considered within the scope of the invention. Still further, the composition may include other optional ingredients such as, for example, surfactants, alcohols, etc. to improve the characteristics of the composition.

The advantages of this invention should be fairly apparent from the disclosure above. In order to elucidate the composition and method disclosed herein provide a uniquely suitable coating composition which is particularly suitable for use as a conditioner or preservative coating on automobile vinyl tops. The composition enables a uniform application appearance without streaking and the composition is easy to apply and make use of in general practice. Furthermore, the composiiton is stable and has an indefinite shelf life as presently determined. The method and composition of this invention provide a glossy finished surface and give a depth of color to the coated substrate without excessive film buildup.

In order to further illustrate the invention, the following examples are provided. It is to be understood, however, that the examples are included for illustrative purposes and are not intended to be limiting of the scope of the invention as set forth in the subjoined claims.

EXAMPLES.—WEIGHT PERCENT

| | 4 | 5 | 6 | 7 | 8 | 9 |
|---|---|---|---|---|---|---|
| Stepanyl 324–57 (50% solids) (described hereinabove) | 2 | 8 | 4 | 10 | 8 | 30 |
| Emulsified silicone oil (100,000 centistoke) (35% solids) | 5.5 | 4 | 2 | 20 | 4 | 6 |
| Water | 92.5 | 88 | 94 | 70 | Bal. | Bal. |
| Drier: | | | | | | |
| Manganese naphthenate (6% Mn) | | | | | 0.1 | 4 |
| Lead naphthenate (24% Pb) | | | | | | 0.06 |
| Alcohol (for surfactant purposes, etc.) | | | | | | |
| isopropyl | | | | | 15 | 13 |

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A coating composition comprised of:
   (a) about 0.5% to about 10% by weight emulsified organopolysiloxane oil, said oil having a viscosity from about 350 to about 250,000 centistokes at about 25° C.,
   (b) from about 1% to about 20% by weight on an active resin basis of water reducible polyester resin, said resin having
       a set time of less than about 8 hours, and a cure temperature from about 32° F. to about 120° F.
   (c) zero to about 2% by weight of a drier selected from the group consisting of
       naphthentes, linoresinates, linoleates, hexates, resinates or inorganic salts of cobalt, copper, lead, manganese, zinc, calcium, iron or aluminum,
   (d) carrier fluid as the balance of the composition.

2. The composition of claim 1 wherein said oil viscosity is from about 50,000 to about 150,000 centistokes.

3. The composition of claim 1 wherein said oil viscosity is about 100,000 centistokes.

4. The composition of claim 1 wherein said oil is present from about 2% to about 8% by weight.

5. The composition of claim 1 wherein said resin is present from about 2% to about 10% by weight.

6. The composition of claim 1 wherein said set time for the resin is less than about one hour.

7. The composition of claim 1 wherein said drier is present from about 0.01% to about 1.5% by weight.

8. The composition of claim 7 wherein said oil viscosity is from about 50,000 to about 150,000 centistokes.

9. The composition of claim 8 wherein said oil is present from about 2% to about 8% by weight, said resin is present from about 2% to about 10% by weight, and said set time for the resin is less than one hour.

10. An aerosol container including the composition of claim 1.

(References on following page)

References Cited

UNITED STATES PATENTS

| | | | |
|---|---|---|---|
| 2,427,255 | 9/1947 | Burrell et al. | 106—8 |
| 2,523,281 | 9/1950 | Currie | 106—3 |
| 2,626,870 | 1/1953 | Cooke et al. | 106—10 |
| 2,702,276 | 2/1955 | Green | 252—8.6 |
| 2,733,154 | 1/1956 | Taylor | 106—8 |
| 2,856,297 | 10/1958 | Geen | 106—3 |
| 3,098,834 | 7/1963 | Jerabek | 260—23.7 |
| 3,305,504 | 2/1967 | Huntington | 260—29.2 |
| 3,328,481 | 7/1967 | Vincent | 260—22 |
| 3,345,313 | 10/1967 | Ruhf et al. | 260—22 |
| 3,449,465 | 6/1969 | Gölitz et al. | 260—824 |

FOREIGN PATENTS 504,115  7/1954  Canada.

DONALD E. CZAJA, Primary Examiner

R. W. GRIFFIN, Assistant Examiner

U.S. Cl. X.R.

106—3, 8, 10; 117—124, 132, 138.8, 142, 161; 260—29.2, 32.4, 32.6, 32.8, 33.2, 33.4, 33.6, 824